United States Patent [19]
Higuchi et al.

[11] Patent Number: 6,152,614
[45] Date of Patent: Nov. 28, 2000

[54] SHUTTER ASSEMBLY

[75] Inventors: Masayu Higuchi; Kazuyuki Iwasa, both of Hino, Japan

[73] Assignee: Olympus Optical Co., Ltd., Japan

[21] Appl. No.: 09/362,933

[22] Filed: Jul. 28, 1999

[30] Foreign Application Priority Data

Jul. 30, 1998 [JP] Japan .................................. 10-215994

[51] Int. Cl.[7] .................................................. G03B 9/20
[52] U.S. Cl. ............................................................ 396/501
[58] Field of Search .................................. 396/501, 500, 396/499, 498, 497, 510

[56] References Cited

U.S. PATENT DOCUMENTS 5,534,961 7/1996 Dowe et al. ............................. 396/500

FOREIGN PATENT DOCUMENTS 45-35737 11/1970 Japan .
54-135527 10/1979 Japan .

*Primary Examiner*—W. B. Perkey
*Attorney, Agent, or Firm*—Ostrolenk, Faber, Gerb & Soffen, LLP

[57] ABSTRACT

A shutter assembly has a first sector that moves in a first direction to allow a photographic light flux to pass through and moves in a second direction to block at least a part of the photographic light flux; a second sector that moves in the second direction to allow the photographic light flux to pass through and moves in the first direction to block a part of the photographic light flux, the part being different from the part of the photographic light flux to be blocked by the first sector; and a third sector that moves in the second direction to allow the photographic light flux to pass through and moves in the first direction to block a part of the photographic light flux, the part being different from the part of the photographic light flux blocked by the first sector and the second sector.

27 Claims, 3 Drawing Sheets

SHUTTER ASSEMBLY

BACKGROUND OF THE INVENTION

1. Technical Field

The present invention relates to a shutter assembly, particularly, to a shutter assembly for cameras and other optical apparatuses.

2. Related Art

Conventionally, for shutter assemblies, various techniques are known. For example, a shutter technique using two shutter blades has been proposed in Japanese Examined Patent Publication No. 45-35737.

Recently, cameras are required to be increasingly miniaturized, and all devices and components used therein must be miniaturized. Shutter assemblies are not an exception, and various proposals regarding miniaturization have been submitted. For example, a shutter technique using four shutter blades (sectors) to miniaturize a lens housing and a lens shutter has been proposed in Japanese Unexamined Patent Publication No. 54-135527. In this proposal, space efficiency, which is not sufficient with the aforementioned shutter technique using two shutter blades, is improved so as to contribute to miniaturization of cameras.

In designing small apparatuses such as cameras, however, only very small spaces can be provided, and in addition, members to be arranged therein must be changed over time. Therefore, the conventional techniques as described above are not sufficient depending on application requirements. For example, a problem arises in that shutter blades (sectors) operating in small spaces contact other members.

Also, when the number of shutter blades is increased, as in case of the shutter technique using four shutter blades, a problem arises in that light blocking ability for light leakage are apt to be impaired.

SUMMARY OF THE INVENTION

In view of the problems as described above, the present invention has as objects to provide a shutter assembly that ensures prevention of light leakage and implements drastic miniaturization, and to provide a shutter assembly that uses three sectors (shutter blades) to prevent light leakage and to implement minimization of spaces.

A shutter assembly comprising of the present invention has the following: a first sector that moves in a first direction to allow a photographic light flux to pass through and moves in a second direction to block at least a part of the photographic light flux; a second sector that moves in the second direction to allow the photographic light flux to pass through and moves in the first direction to block a part of the photographic light flux, the part being different from the part of the photographic light flux to be blocked by the first sector; and a third sector that moves in the second direction to allow the photographic light flux to pass through and moves in the first direction to block a part of the photographic light flux, the part being different from the part of the photographic light flux blocked by the first sector and the second sector.

Matters such as objects and advantages of the present invention will be apparent from the detailed description given below.

DETAILED DESCRIPTION OF THE PREFERRED EMBODIMENT

Hereinbelow, an embodiment of the present invention is described with reference to the appended drawings.

Figure 1:
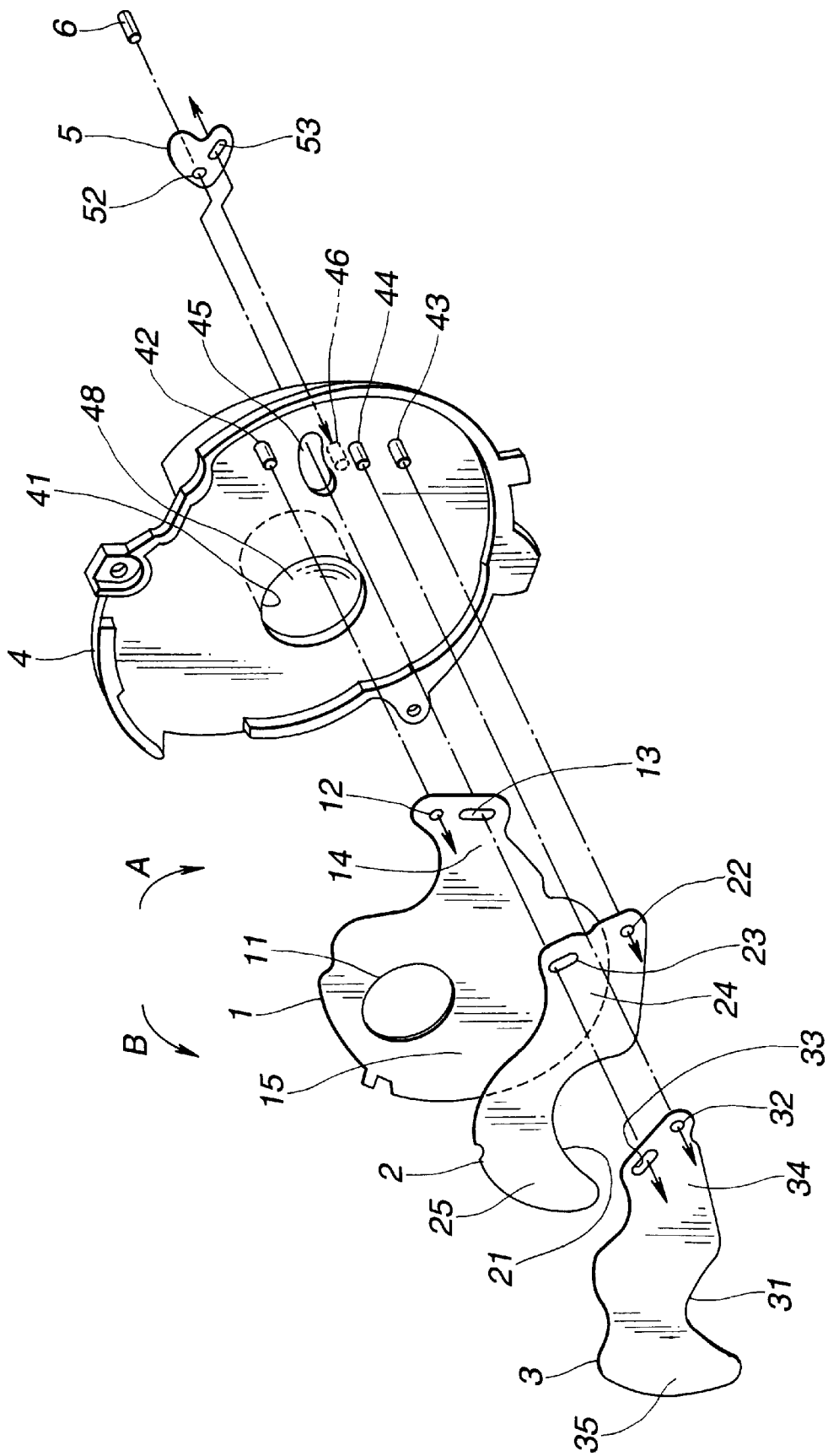
FIG. 1 is an exploded perspective view of a main portion of an embodiment of a camera shutter assembly according to the present invention, viewed from the rear side of the camera.

FIG. 1 is an exploded perspective view of a main portion of an embodiment of a camera shutter assembly according to the present invention, viewed from the rear side of the camera.

As shown in the drawing, the main portion of the shutter assembly is comprised of a shutter base plate 4, a first sector 1, a second sector 2, a third sector 3, a light-blocking blade 5, and a drive pin 6.

The shutter base plate 4 is formed of an elliptical planar material and has a projected exposure opening 41. The exposure opening 41 allows photographic light to pass through from a photographic lens 48 toward a central portion.

The first sector 1 has an opening 11 corresponding to the exposure opening 41 and allows photographic light to pass through. The first sector 1 rotates on a first fixing pin 42 protruding from a portion near the periphery (a right section in the drawing) of one surface side (the reverse side of the camera) of the shutter base plate 4. In the drawing, when the first sector 1 maximally rotates counterclockwise, it allows all of the photographic light to pass through; when it rotates clockwise, it blocks a part of the photographic light.

Similarly to the above, the second sector 2 is provided so as to rotate on a second fixing pin 43 protruding from a portion near the periphery on the same surface side as above of the shutter base plate 4. In the drawing, when the second sector 2 maximally rotates clockwise, it allows all of the photographic light to pass through; when it rotates counterclockwise, it blocks the photographic light. In this case, the photographic light which is blocked is a part of the photographic light, but is different from the part of the photographic light blocked by the first sector 1.

Similarly to the above, the third sector 3 is provided so as to rotate on a third fixing pin 44 protruding from a portion near the periphery on the same surface side of the shutter base plate 4. In the drawing, when the second sector 2 maximally rotates clockwise, it allows all of the photographic light to pass through; when it rotates counterclockwise, it blocks the photographic light. In this case, the photographic light which is blocked is a part of the photographic light, but is different from the part of the photographic light blocked by the first sector 1 and the second sector 2.

The light-blocking blade 5 is provided on the other surface side of the shutter base plate 4 to block light leaking through a drive-pin hole 45 formed on the shutter base plate 4.

The drive pin 6 is driven by a driving source (not shown) as guided by the drive-pin hole 45 to drive the first sector 1, the second sector 2, and the third sector 3.

The shutter base plate 4, an elliptical planar member, is arranged on the rear side of the photographic lens 48 (an ordinary photographic lens). On the periphery of the shutter base plate 4, flanges are formed as required. Also, the exposure opening 41 is projected from the central portion thereof to allow photographic light to pass through from the photographic lens 48. The exposure opening 41 allows all of the photographic light to pass through from the photographic lens 48.

The first fixing pin 42, the second fixing pin 43, and third fixing pin 44 are formed protruding backward from right sections near the periphery of the rear side surface of the shutter base plate 4. In the drawing, in the order from the upper side to the lower side, the first fixing pin 42, the third fixing pin 44, and the second fixing pin 43 are arranged. The fixing pins 42, 43, and 44 respectively serve as rotation axes for the first sector 1, the second sector 2, and the third sector 3.

The drive pin 6, is inserted between the first fixing pin 42 and the third fixing pin 44, and the drive-pin hole 45 that is substantially a long hole is formed. The drive-pin hole 45 defines respective rotation ranges of the first sector 1, the second sector 2, and the third sector 3. The drive pin 6 is inserted into the drive-pin hole 45 so as to be guided thereby. This is described below in more detail.

A fourth fixing pin 46 protrudes toward the front side of the camera from the front side surface of the shutter base plate 4 in the vicinity of the drive-pin hole 45. This fourth fixing pin 46 engages with the light-blocking blade 5.

The first sector 1 is formed of a thin plate. It is arranged so as to be rotatable on the rear side surface of the shutter base plate 4, and concurrently, is arranged tightly so that light does not leak from port ions overlapping with the shutter base plate 4. Also, a first axis hole 12 is formed on a base end section 14 of the first sector 1 to engage with the first fixing pin 42 and is rotatably supported by the first fixing pin 42. In this way, the first sector 1 is rotatable either clockwise (as indicated by arrow A in the drawing) or counterclockwise (as indicated by arrow B in the drawing) on the first fixing pin 42.

A first long hole 13 is formed near the first axis hole 12 (lower portion of the base end section 14 in FIG. 1) to receive the drive pin 6. Thus, the drive pin 6 is received by both the drive-pin hole 45 of the shutter base plate 4 as well as the first long hole 13. When the drive pin 6 moves as guided by the drive-pin hole 45, the first sector 1 rotates via the first long hole 13. The rotation range of the first sector 1 is defined by the movement range of the drive pin 6 that moves as guided by the drive-pin hole 45, as described below in detail.

A free end section 15 of the first sector 1 is substantially elliptical, and the opening 11 is formed on an upper portion thereof. The opening 11 is substantially circular so as to be larger than the exposure opening 41. When the first sector 1 maximally rotates in the counterclockwise direction B, the opening 11 is positioned opposite to the exposure opening 41. That is, when the first sector 1 maximally rotates in the counterclockwise direction B, it is positioned so as to allow all of the photographic light to pass (fully-open position).

In contrast, when the first sector 1 rotates in the clockwise direction A, the opening 11 moves away from the exposure opening 41; when it maximally rotates, it moves away from the opening 11, except for a part remaining thereon. That is, when the first sector 1 maximally rotates in the clockwise direction A, the exposure opening 41 is substantially blocked by the free end section 15, which is a section other than the opening 11.

The second sector 2 is formed of a thin plate. It is arranged so as to be rotatable on the rear side surface of the first sector 1, and concurrently, is arranged tightly so that light does not leak from portions overlapping with the shutter base plate 4 and the first sector 1. Also, a first axis hole 22 is formed on a base end section 24 to engage with the second fixing pin 43 and is rotatably supported by the first fixing pin 42 (In FIG. 1, the second fixing pin 43 is provided at a portion lower than the first fixing pin 42). In this way, the second sector 2 is arranged to be rotatable either clockwise (as indicated by the arrow A in the drawing) or counterclockwise (as indicated by the arrow B in the drawing) on the second fixing pin 43.

A second long hole 23 is formed near the second axis hole 22 (upper portion of the base end section 24 in FIG. 1) so as to receive the drive pin 6. Thus, the drive pin 6 is received by the drive-pin hole 45, the first long hole 13, as well as the second long hole 23. When the drive pin 6 moves as guided by the drive-pin hole 45, the second sector 2 rotates via the second long hole 23. The rotation range of the second sector 2 is defined by the movement range of the drive pin 6, which moves as guided by the drive-pin hole 45.

A free end section 25 of the second sector 2 is substantially arc shaped, and a semicircular section 21 whose diameter is somewhat larger than that of the exposure opening 41 is formed. When the second sector 2 maximally rotates in the clockwise direction A, the semicircular section 21 is positioned so that it has moved completely away from the exposure opening 41. That is, when the second sector 2 maximally rotates in the clockwise direction A, it is positioned so as to allow all of the photographic light to pass (fully-open position).

In contrast, when the second sector 2 rotates in the counterclockwise direction B, the free end section 25 moves gradually so as to cover the exposure opening 41. Even when the second sector 2 maximally rotates in the counterclockwise direction B, it does not cover the entire exposure opening 41, and it is positioned so that a part of the photographic light is blocked.

The third sector 3 is shaped similar to the second sector 2 and is formed of a thin plate. It is arranged so as to be rotatable on the rear side surface of the second sector 2, and concurrently, is arranged tightly so that light does not leak from portions overlapping with the shutter base plate 4, the first sector 1, and the second sector 2. Also, a third axis hole 32 is formed on a base end section 34 to engage with the third fixing pin 44 and is rotatably supported by the third fixing pin 44 (In FIG. 1, the third fixing pin 44 is provided at a portion lower than the first fixing pin 42 and above the second fixing pin 43). Thus, the third sector 3 is arranged so as to be rotatable either clockwise (as indicated by the arrow A in the drawing) or counterclockwise (as indicated by the arrow B in the drawing) on the third fixing pin 44.

Furthermore, a third long hole 33 is formed near the third axis hole 32 (upper portion of the base end section 34 in FIG. 1) to receive the drive pin 6. Thus, the drive pin 6 is received by the drive-pin hole 45, the first long hole 13, the second long hole 23, as well as the third long hole 33. As the drive pin 6 moves as guided by the drive-pin hole 45, the third sector 3 rotates via the third long hole 33. Similarly to the above, the rotation range of the third sector 3 is defined by the movement range of the drive pin 6, which moves as guided by the drive-pin hole 45.

A free end section 35 of the third sector 3 is substantially arc shaped, similarly to the free end section 25 of the second sector 2, and a semicircular section 31 whose diameter is somewhat larger than that of the exposure opening 41 is formed. When the third sector 3 maximally rotates in the clockwise direction A, similarly to the case of the second sector 2, the semicircular section 31 is positioned where it moved away completely from the exposure opening 41. That is, when the third sector 3 maximally rotates in the clockwise direction A in a manner similar to the case of the second sector 2, it is positioned so as to allow all of the photographic light to pass (fully-open position).

In contrast, when the third sector 3 rotates in the counterclockwise direction B, the free end section 35 moves gradually so as to cover the exposure opening 41. Even when -the third sector 3 maximally rotates in the counterclockwise direction B, it does not cover the entirety of the exposure opening 41, and it is positioned so that a part of the photographic light is blocked. As described below, this position is different from the blocking position of the second sector 2.

The light-blocking blade 5 serves as a light-leakage preventing means for preventing possible leakage of light from the drive-pin hole 45. The light-blocking blade 5 is formed of a thin-sheet material, substantially L-shaped, and is arranged so as to oppose a front side of the drive-pin hole 45, which is a through-hole formed in the shutter base plate 4. Also, the light-blocking blade is arranged tightly with a holding member (not shown) so as not to allow light leakage at a portion contacting the shutter base plate 4. The material for the light-blocking blade is preferably a black polyester sheet. Also, a material similar to the above is preferably used for the individual sectors 1, 2, and 3.

In addition to the above, a long hole 53 is formed in a base end section of the light-blocking blade 5 so as to slidably receive the fourth fixing pin 46. Also, an axis hole 52 is formed in a free-end section of the light-blocking blade 5 so as to rotatably receive the drive pin 6. Thus, the drive pin 6 is first received by the axis hole 52, and is received by the holes in the order of the drive-pin hole 45, the first long hole 13, the second long hole 23, and the third long hole 33. In this arrangement, when the drive pin 6 is driven by a drive source (not shown) to move as guided by the drive-pin hole 45, the light-blocking blade 5 slidably and rotatably moves on the fourth fixing pin 46 within the range of the long hole 53.

Figure 2:
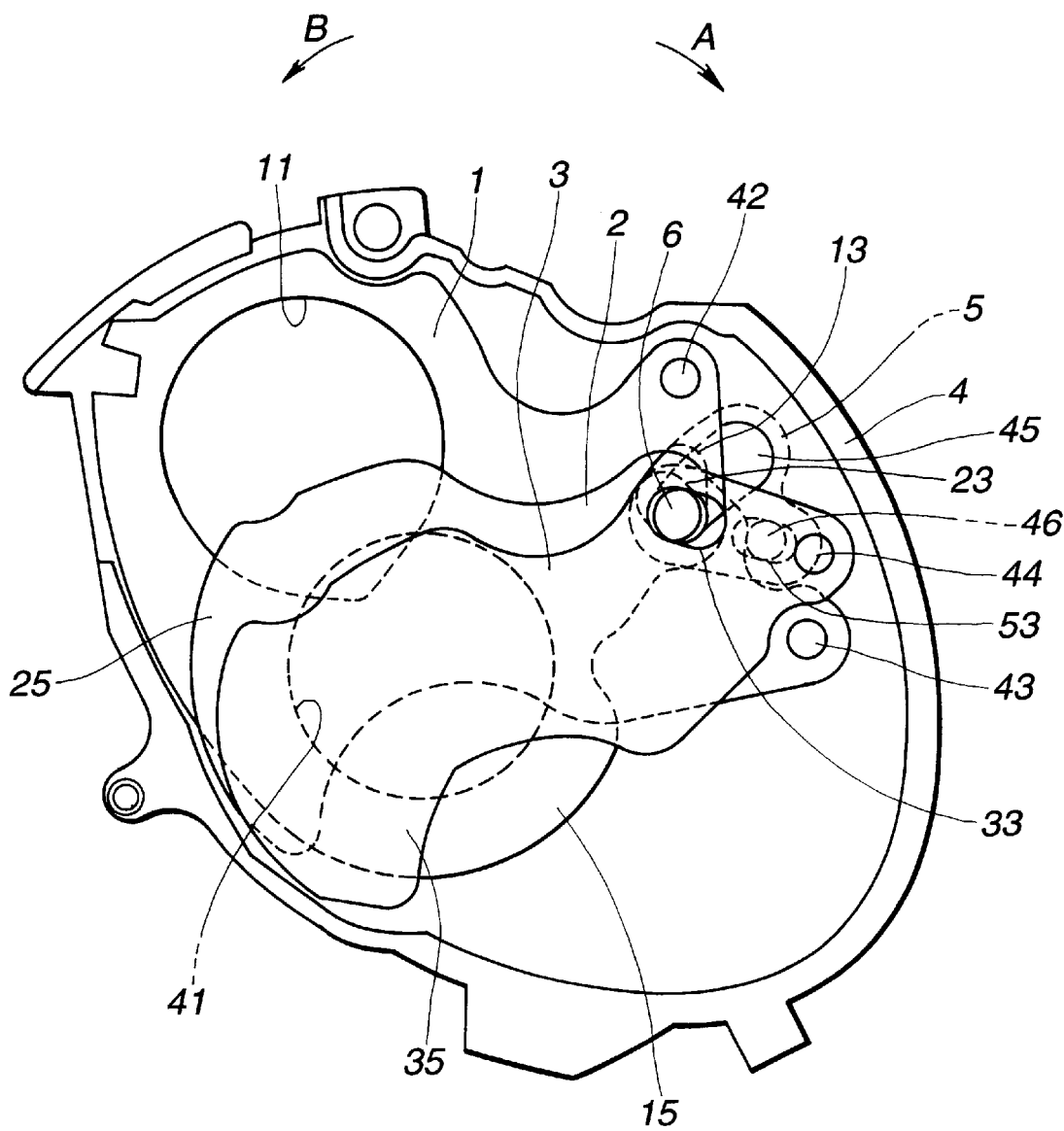
FIG. 2 is a view (viewed from the rear side of the camera) of first to third sectors, a shutter base plate, and a light-blocking blade 5 when the shutter assembly is in a fully-closed mode, in which the entirety of the exposure opening 41 is covered, in an embodiment of the present invention.
Figure 3:
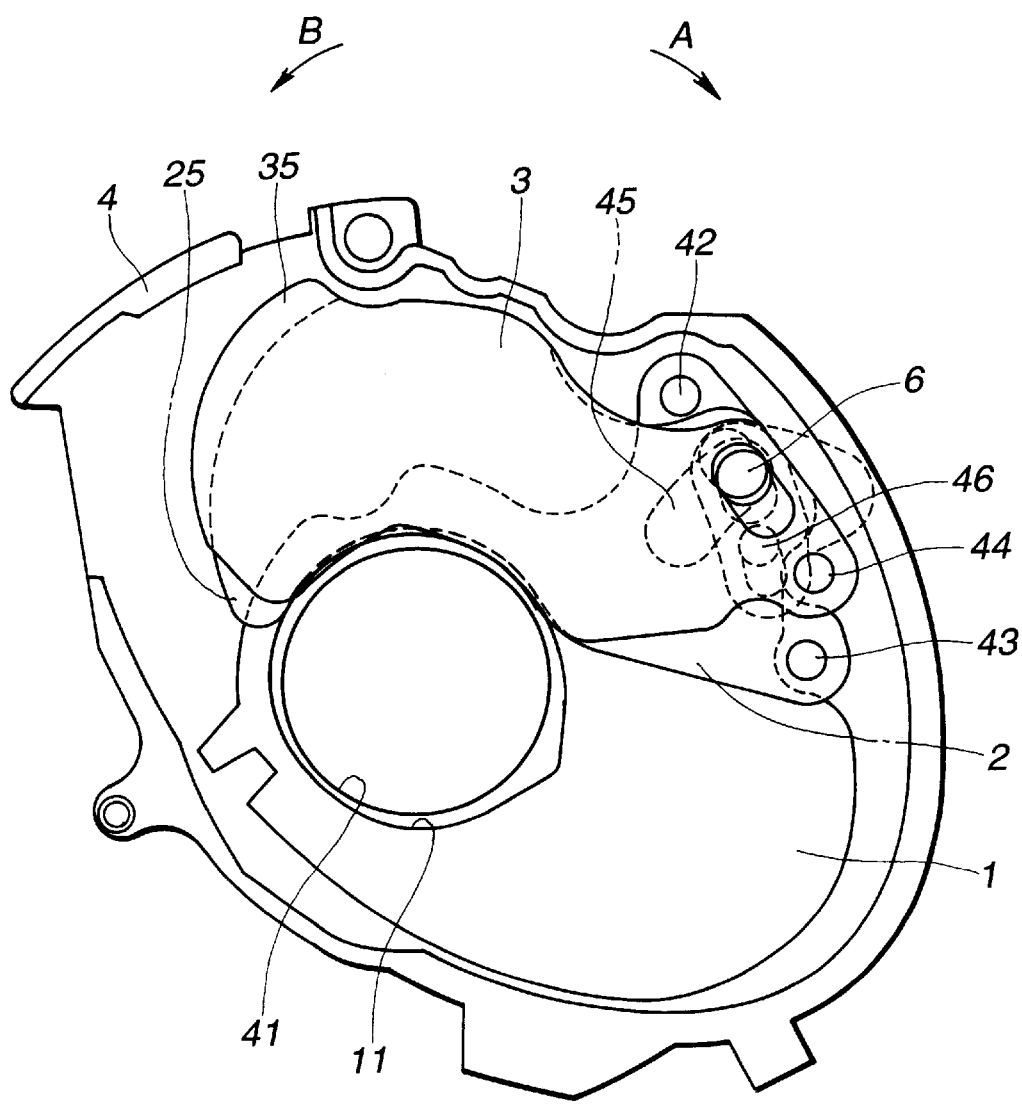
FIG. 3 is a view (viewed from the rear side of the camera) of the first to third sectors 1, 2, and 3, the shutter base plate 4, and the light-blocking blade 5 when the shutter assembly is in a fully-open mode, in which the entirety of the exposure opening 41 is open, in an embodiment of the present invention.

Next, referring to FIGS. 2 and 3, a description will be given of operation of the shutter assembly. FIG. 2 is a view (viewed from the rear side of the camera) of the individual sectors 1, 2, and 3, the shutter base plate 4, and the light-blocking blade 5 when the shutter assembly is in a fully-closed mode in which the entirety of the exposure opening 41 is covered. FIG. 3 is a view (viewed from the rear side of the camera) of the individual sectors 1, 2, and 3, the shutter base plate 4, and the light-blocking blade 5 when the shutter assembly is in a fully-open mode in which the entirety of the exposure opening 41 is open.

First, with reference to FIG. 2, a description will be given of the fully-closed mode in which the entirety of the exposure opening 41 is covered.

To cover the exposure opening 41 with members such as the first sector 1, the second sector 2, and the third sector 3, the drive pin 6 is arranged so as to be driven by means of a drive source (not shown) to move as guided by the drive-pin hole 45 to the lower end in the drawing. According to this movement of the drive pin 6, the shutter assembly operates as follows:

(1) The first sector 1 rotates on the first fixing pin 42 in the clockwise direction A (a first direction) since the first long hole 13 follows movement of the drive pin 6. This allows the opening 11 to move away from the exposure opening 41, and the free end section 15 blocks the majority of the exposure opening 41.

(2) The second sector 2 rotates on the second fixing pin 43 in the counterclockwise direction B (a second direction) since the second long hole 23 follows movement of the drive pin 6. This allows the free end section 25 to move so as to cover the exposure opening 41, thus, blocking a part of the exposure opening 41 which could not be blocked by the first sector 1.

(3) The third sector 3 rotates on the third fixing pin 44 in the counterclockwise direction B (the second direction) since the third long hole 33 follows movement of the drive pin 6. This allows the free end section 35 to move so as to cover the exposure opening 41, thus, blocking a part of the exposure opening 41 which could not be blocked by the second sector 2.

As described above, the first sector 1, the second sector 2, and the third sector 3 cooperate according to movement of the drive pin 6, and the free end sections thereof block the exposure opening 41 completely. That is, the entirety of the exposure opening 41 can be covered completely by a suitable arrangement in which the first sector 1, the second sector 2, and the third sector 3 cooperate with each other, although each sector cannot cover the entirety of the exposure opening 41.

The above operation blocks the exposure opening 41 completely; however, since the drive-pin hole 45 is arranged, possible light leakage therethrough must be taken into consideration to achieve miniaturization of cameras. Taking this into account, this embodiment is provided with the light-blocking blade 5 for preventing possible light leakage through the drive-pin hole 45.

In the fully-closed mode, as shown in FIG. 2, that is, when the drive pin 6 is moved as guided by the drive-pin hole 45 and reaches the lower end in the drawing, in accordance with movement of the drive pin 6, the light-blocking blade 5 rotates in the counterclockwise direction B on the fourth fixing pin 46 since the axis hole 52 follows the movement of the drive pin 6. In this operation, the free-end section of the light-blocking blade 5 allows drive-pin hole 45 to be covered from the front side, thereby preventing possible light leakage through the drive-pin hole 45.

For preventing possible light leakage through the axis hole 52, it is formed circularly so as to rotatably engage with the drive pin 6. Thus, the long hole 53 regulates movement according to reciprocating operation of the light-blocking blade 5.

Hereinbelow, with reference to FIG. 3, a description will be given of the fully-open mode in which the exposure opening 41 is open.

To cause the first sector 1, the second sector 2, and the third sector 3 to move away from the exposure opening 41, the drive pin 6 is arranged so as to be driven to move as guided by the drive-pin hole 45 to the upper end in the drawing. According to the movement of the drive pin 6, the shutter assembly operates as follows:

(1) The first sector 1 rotates on the first fixing pin 42 in the counterclockwise direction B (the second direction) since the first long hole 13 follows movement of the drive pin 6. This allows the opening 11 to move to the opposing surface of the exposure opening 41, thereby causing the exposure opening 41 to be open.

(2) The second sector 2 rotates on the second fixing pin 43 in the clockwise direction A (the first direction) since the second long hole 23 follows movement of the drive pin 6. This allows the free end section 25 to move away from the exposure opening 41 completely, thus, causing the exposure opening 41 to be open.

(3) The third sector 3 rotates on the third fixing pin 44 in the clockwise direction A (the first direction) since the third long hole 33 follows movement of the drive pin 6. This allows the free end section 35 to move away from the exposure opening 41 completely, thus, causing the exposure opening 41 to be open.

As described above, the first sector 1, the second sector 2, and the third sector 3 cooperate to move according to movement of the drive pin 6 so as to make the exposure opening 41 to be open.

According to movement of the drive pin 6, the light-blocking blade 5 rotates in the clockwise direction A on the fourth fixing pin 46 and moves away from side of the drive-pin hole 45. In this case, since the drive-pin hole 45 need not be covered in the fully-open mode, no problems arise in this regard.

As described above, according to the shutter assembly of this embodiment, the three sectors (shutter blades), which are individually small so as not to cover the entirety of the exposure opening 41, are arranged so as to cooperate and are suitably arranged to prevent light leakage and to save space.

Furthermore, the light-blocking blade that operates with the same driving source as that provided for the above is provided. This ensures the prevention of possible light leakage through the hole for the drive pin.

As described above, the present invention allows the provision of a shutter assembly that ensures prevention of light leakage and allows drastic miniaturization.

In the above embodiment, the first sector, the second sector, and the third sector cooperate to move the drive pin 6, but the drive pin may be provided to, for example, a lever member, in which the lever member is operated to drive the drive pin. When the drive pin 6 is provided to the lever member, a pair of stopper members may be provided for controlling the movement range of the lever member may be arranged on a different member from the shutter base plate 4.

Also, in the embodiment, although the movement ranges of the individual sectors are controlled by the movement range of the drive pin 6, the movement may be controlled by making an arrangement in which the individual sectors abut, for example, ribs to control the movement ranges.

Furthermore, in this embodiment, three sectors are arranged in the order as shown in FIG. 1, there is no restriction thereto, and the order may be arranged in different orders.

In the present invention, it is apparent that working modes differing over a broad range can be arranged without departing from the spirit and scope of the invention. In addition, this invention is not restricted to any specific embodiment.

What is claimed is:

1. A shutter assembly comprising:
   a first sector that moves in a first direction to allow a photographic light flux to pass through and moves in a second direction to block at least a part of the photographic light flux;
   a second sector that moves in the second direction to allow the photographic light flux to pass through and moves in the first direction to block a part of the photographic light flux, the part being different from the part of the photographic light flux blocked by the first sector; and
   a third sector that moves in the second direction to allow the photographic light flux to pass through and moves in the first direction to block a part of the photographic light flux, the part being different from the part of the photographic light flux blocked by the first sector and the second sector.

2. A shutter assembly as claimed in claim 1, wherein the first to third sectors cooperate either to allow a part or all of the photographic light flux to pass through or to block a part or all of the photographic light flux.

3. A shutter assembly as claimed in claim 1, wherein the first to third sectors are arranged so as to be movable, a shutter base plate having an exposure opening is provided, and the first to third sectors cooperate to cause the exposure opening to be open or to be blocked.

4. A shutter assembly as claimed in claim 1, wherein the first sector has a surface opposing the photographic light flux which is larger than that of the second sector and the third sector.

5. A shutter assembly as claimed in claim 1, wherein the second sector and the third sector rotate substantially within the same tracks as the first sector.

6. A shutter assembly as claimed in claim 3, wherein the exposure opening is open when the first sector rotates maximally in the first direction, and the second sector and the third sector rotate maximally in the second direction.

7. A shutter assembly as claimed in claim 3, wherein the exposure opening is closed when the first sector rotates maximally in the second direction, and the second sector and the third sector rotate maximally in the first direction.

8. A shutter assembly as claimed in claim 6, wherein the second sector and the third sector move away in an occupying region when the first sector and the second sector rotate maximally in the second direction.

9. A shutter assembly as claimed in claim 8, wherein the second sector and the third sector move away in at least a partially overlapped state.

10. A shutter assembly comprising:
    a shutter base plate having an exposure opening, a first fixing member, a second fixing member, and a third fixing member;
    a first sector that engages the first fixing member and rotates on the first fixing member in a first direction to allow a photographic light flux to pass through and rotates in a second direction to block at least a part of the photographic light flux;
    a second sector that engages with the second fixing member and rotates on the second fixing member in a second direction to allow the photographic light flux to pass through and rotates in the first direction to block a part of the photographic light flux, the part being different from the part of the photographic light flux blocked by the first sector; and
    a third sector that engages with the third fixing member and rotates on the third fixing member in the second direction to allow the photographic light flux to pass through and rotates in the second direction to block a part of the photographic light flux, the part being different from the part of the photographic light flux blocked by the first sector and the second sector.

11. A shutter assembly as claimed in claim 10, wherein the first to third sectors cooperate either to allow a part or all of the photographic light flux to pass through or to block a part or all of the photographic light flux.

12. A shutter assembly as claimed in claim 10, wherein the first to third sectors are arranged so as to be movable, a shutter base plate having an exposure opening is provided, and the first to third sectors cooperate to cause the exposure opening to be open or to be blocked.

13. A shutter assembly as claimed in claim 10, wherein the first sector has a surface opposing the photographic light flux which is larger than that of the second sector and the third sector.

14. A shutter assembly as claimed in claim 10, wherein the second sector and the third sector rotate substantially within the same tracks as the first sector.

15. A shutter assembly as claimed in claim 12, wherein the exposure opening is open when the first sector rotates maximally in the first direction, and the second sector and the third sector rotate maximally in the second direction.

16. A shutter assembly as claimed in claim 12, wherein the exposure opening is closed when the first sector rotates maximally in the second direction, and the second sector and the third sector rotate maximally in the first direction.

17. A shutter assembly as claimed in claim 15, wherein the second sector and the third sector move away in an occupying region when the first sector and the second sector rotate maximally in the second direction.

18. A shutter assembly as claimed in claim 17, wherein the second sector and the third sector move away in at least a partially overlapped state.

19. A shutter assembly comprising:
- a shutter base plate having an exposure opening, a first fixing member, a second fixing member, and a third fixing member;
- a first sector that engages the first fixing member and rotates on the first fixing member in a first direction to allow a photographic light flux to pass through and rotates in a second direction to block at least a part of the photographic light flux;
- a second sector that engages with the second fixing member and rotates on the second fixing member in a second direction to allow the photographic light flux to pass through and rotates in the first direction to block a part of the photographic light flux, the part being different from the part of the photographic light flux blocked by the first sector;
- a third sector that engages with the third fixing member and rotates on the third fixing member in the second direction to allow the photographic light flux to pass through and rotates in the second direction to block a part of the photographic light flux, the part being different from the part of the photographic light flux blocked by the first sector and the second sector;
- a first long hole provided on the shutter base plate, a second long hole provided on the first sector, a third long hole provided on the second sector, and a fourth long hole provided on the third sector; and
- a drive member received through the first to fourth long holes, and the first to the fourth long holes are moved to define rotation ranges of the first to third sectors.

20. A shutter assembly as claimed in claim 19, wherein the first to third sectors cooperate either to allow a part or all of the photographic light flux to pass through or to block a part or all of the photographic light flux.

21. A shutter assembly as claimed in claim 19, wherein the first to third sectors are arranged so as to be movable, a shutter base plate having an exposure opening is provided, and the first to third sectors cooperate to cause the exposure opening to be open or to be blocked.

22. A shutter assembly as claimed in claim 19, wherein the first sector has a surface opposing the photographic light flux which is larger than that of the second sector and the third sector.

23. A shutter assembly as claimed in claim 19, wherein the second sector and the third sector rotate substantially within the same tracks as the first sector.

24. A shutter assembly as claimed in claim 21, wherein the exposure opening is open when the first sector rotates maximally in the first direction, and the second sector and the third sector rotate maximally in the second direction.

25. A shutter assembly as claimed in claim 21, wherein the exposure opening is closed when the first sector rotates maximally in the second direction, and the second sector and the third sector rotate maximally in the first direction.

26. A shutter assembly as claimed in claim 24, wherein the second sector and the third sector move away in an occupying region when the first sector and the second sector rotate maximally in the second direction.

27. A shutter assembly as claimed in claim 26, wherein the second sector and the third sector move away in at least a partially overlapped state.

* * * * *